(12) United States Patent
Reed

(10) Patent No.: US 8,875,640 B1
(45) Date of Patent: *Nov. 4, 2014

(54) SLURRY APPLICATOR FOR AN AGRICULTURAL MACHINE

(71) Applicant: VTI, L.L.C., Washington, IA (US)

(72) Inventor: Phillip E. Reed, Washington, IA (US)

(73) Assignee: VTI, L.L.C., Washington, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/017,829

(22) Filed: Sep. 4, 2013

Related U.S. Application Data

(62) Division of application No. 13/113,610, filed on May 23, 2011, now Pat. No. 8,550,019.

(60) Provisional application No. 61/423,462, filed on Dec. 15, 2010.

(51) Int. Cl.
| | | |
|---|---|---|
| A01B 21/02 | (2006.01) | |
| A01B 59/00 | (2006.01) | |
| A01C 5/00 | (2006.01) | |
| A01C 13/00 | (2006.01) | |
| A01C 23/02 | (2006.01) | |
| A01C 21/00 | (2006.01) | |

(52) U.S. Cl.
CPC ............ *A01C 23/021* (2013.01); *A01C 21/002* (2013.01)
USPC ........... 111/119; 111/121; 111/166; 111/167; 111/193; 172/540; 172/583; 172/604

(58) Field of Classification Search
CPC ............................. A01C 23/021; A01C 21/002
USPC ......... 111/120–122, 149, 157–169, 190–196; 172/518, 540–576, 579–604
See application file for complete search history.

(56) References Cited

U.S. PATENT DOCUMENTS

| | | |
|---|---|---|
| 3,378,585 A | 4/1968 | Giacomo |
| 5,272,992 A | 12/1993 | Barbour et al. |
| 5,370,068 A | 12/1994 | Rawson et al. |
| 5,649,602 A | 7/1997 | Bruce |
| 5,657,707 A | 8/1997 | Dresher et al. |
| 5,785,129 A | 7/1998 | Keller et al. |

(Continued)

FOREIGN PATENT DOCUMENTS

| | | |
|---|---|---|
| CA | 2561846 | 4/2008 |
| EP | 1774844 | 4/2007 |

OTHER PUBLICATIONS

Shafer Welding, Schaferweldingsmole, "The Mole Manure Applicator", Sep. 29, 2010, You Tube—Screen print of website video: http://www.youtube.com/watch?v=TdFSGPDaLPo&feature=youtu.be (Z12).

(Continued)

*Primary Examiner* — Christopher J Novosad
(74) *Attorney, Agent, or Firm* — Jason R. Sytsma; Shuttleworth & Ingersoll, PLC

(57) ABSTRACT

A trough is cut in the ground surface by a rotating member. The rotating member displaces soil upward with respect to the ground surface and rearwardly with respect to a direction of travel of the rotating member. While the soil is in the air, slurry is deposited into the trough. The soil is then redirected downward to the trough to cover the slurry with the soil.

19 Claims, 6 Drawing Sheets

(56) References Cited

U.S. PATENT DOCUMENTS

| | | | |
|---|---|---|---|
| 6,138,590 | A | 10/2000 | Colburn, Jr. |
| 6,701,856 | B1 | 3/2004 | Zoske et al. |
| 7,143,838 | B2 | 12/2006 | Piccat |
| 7,565,870 | B2 | 7/2009 | Martin |
| 7,575,066 | B2 | 8/2009 | Bauer |
| 7,581,503 | B2 | 9/2009 | Martin et al. |
| 7,823,807 | B1 | 11/2010 | Bauer |
| 2008/0302286 | A1 | 12/2008 | Martin |

OTHER PUBLICATIONS

Shafer Welding, Schaferweldingsmole, "Schafer Weldings Mole 3pt Wing Fold Manure Appli . . . ", Jan. 17, 2011, You Tube—Screen print of website video: http://youtu.be/IsCcLfe_Go (Z13).

Yetter Farm Equipment, screen print from www.yetterco.com product page for Yetter Avenger (Z1)

Yetter Farm Equipment, "Yetter Avenger Deep Placement System" Oct. 18, 2011, You Tube—screen print of website video: http://youtu.be/lwGcaIHlldI (Z2).

SoilWarrior—Screen print from webpage: http://soilwarrior.com/equipment/soilwarrior/ (Z3).

Puck Custom Enterprises, Inc. "Pull-Type Applicator—ETS & PCE", Apr. 30, 2012, You Tube—Screen print of website video: http://www.youtube.com/watch?v=hYhQgamgmNc (Z4).

Soil Warrior—Screen print from webpage: http://soilwarrior.com/equipment/honeywarrior/ (Z5).

Yetter Farm Equipment—2987 Magnum for Fertilizer Application—screen print from online catalog at: http://www.yetterco.com/medialibrary/documents/364.pdf (Z6).

Yetter Farm Equipment, Mick Zoske, "Yetter NH3 Magnum on Zoske's 60' 3pt Toolbar Pulled with John D . . . " Jun. 6, 2012, Screen print of website video: http://www.youtube.com/watch?v=c9BCPgprDTA&feature=youtu.be (Z7).

Yetter Farm Equipment, Mick Zoske, "12 Row Yetter NH3 Magnum on Zoske's60' Toolbar Pulled with Jo . . . ", Jun. 4, 2012, You Tube—Screen print of website video at: http://youtu.be/QTiqGuyT4Tw (Z8).

Yetter Farm Equipment, Mick Zoske, "Yetter NH3 Magnum on Zoske's 60' Toolbar Pulled with John Deer . . . ", Jun. 6, 2012, You Tube—Screen print of website video: ttp://youtu.be/WmaQULgq1mM (Z9).

Yetter Farm Equipment, Mick Zoske, "Yetter NH3 Magnum on Zoske's 60' 3pt Toolbar Doing Head Lands", Jun. 6, 2012, You Tube—Screen print of website video: http://www.youtube.com/watch?v=NdLtcOgBC-Y&feature=youtu.be (Z10).

Yetter Farm Equipment, Adam Fenning, "Azland Avenger Toolbar visit fenningeqeuipment.com for info on disc . . . ", Dec. 23, 2011, You Tube—Screen print of website video: http://www.youtube.com/watch?v=nc6STxRhbBs&feature=youtu.be (Z11).

Bazooka Farmstar—Coulter Till, Screen print from webpage: http://www.bazookafarmstar.com/products/manure-injection-product/toolbars/coulter/till/ (Z14).

Bzaooka Farmstar, BazookaFarmstar, "Farmstar Coulter Till", Jan. 23, 2012, You Tube—Screen print of website video: http://www.youtube.com/ watch?v=25LfX40cW7Q&feature=youtu.be (Z15).

Wniske, Inc., Mick Zoske, "Winske Inc. TSS No-Till Injector Fall 2012", Sep. 8, 2012, You Tube—Screen print of website video: http://www.youtube.com/watch?v=SdtrpVDK3fM&feature=youtu.be (Z16).

Winske, Inc., Mick Zoske, "Jamesway 9600 Ultra-Trac with Winske 8 Row No-Till Toolbar", Sep. 7, 2012, You Tube—Screen print of website video: http://www.youtube.com/watch?v=OekxSHVWYvk&feature=youtu.be (Z17).

Dawn Equipment, 6000 Universal Fertlizer Applicator, Anhydra 6000—Screen print from webpage: http://www.dawnequipment.com/6000_fertilizer_applicator.html (Z18).

Dawn Equipment, Dawn Equipment, "Description of the 2011 Dawn 6000 Universal Fertilizer Applicator", Sep. 12, 2011, You Tube—Screen print of website video: http://www.youtube.com/watch?v=bgD2rO8XbM4&feature=youtu.be (Z19).

Dawn Equipment, Dawn Equipment, "6000_manure_2009.wmv", Dec. 11, 2009, You Tube—Screen print of website video: http://www.youtube.com/watch?v=fB_iTo9mf7g&feature=youtu.be (Z20).

Dawn Equipment, Dawn Equipment, "Manure Injection Chesapeake Bay Watershed Dawn 6000", You Tube—Screen print of website video: http://youtu.be/6eHiAYkeKfo (Z21).

Dawn Equipment, Dawn Equipment, "Manure Injection Chesapeake Bay Watershed Dawn 6000 part 2", Oct. 21, 2011, You Tube—Screen print of website video: http://www.youtube.com/watch?v=b6qVTjY64Ds&feature=youtu.be (Z22).

Yetter Manufacturing Company, Press Release, New Product Information, "New Attachment Option for Yetter Mavericks Expands Versatility", (Z23).

Yetter Manufacturing Company, Mick Zoske, "Yetter HR Plus Maverick with VTA kit view from toolbar", May 16, 2012, You Tube—Screen print of website video: http://www.youtube.com/watch?v=13L-uh1Bk6c&feature=youtu.be (Z24).

Yetter Manufacturing Company, Mick Zoske, "Yetter HR Plus Maverick with VTA kit in standing corn stalks", May 16, 2012, You Tube—Screen print of website video: http://www.youtube.com/watch?v=77GMWL9AXAQ (Z25).

Till-Tech System, TillTech, "Till-Tech Manure Injector with Stinger attachment.avi", Jan. 4, 2010, You Tube—Screen print of website video: http://www.youtube.com/watch?v=zpaUrhXm1TY&feature=youtu.be (Z26).

Dietrucb Series 70 Manure Injector—Screenprint from webpage at: http://www.haroldsequipment.com/manufacturers/dietrich/manure-injectors/dietrich-series-70-manure-injector (Z27).

CFC Distributors, Inc., Vortex Blade—Screen print from webpage at: http://www.cfcdist.com/shopping/vertical-tillage-blade/vortex-to-fit-disc-arbors-c-6_472.html (Z28).

T. Price, What Should My No-till Planter Look Like, Dec. 1999, Agdex No. 100/741, ISSN No. 0157-8243 found at http:/www.nt.gov.au/d/Content/File/p/Pasture/311 (Z29).

Soil Warrior—Enviromnemtal Tillage Systems, Inc., 16R Mini Warrior video, Sep. 29, 2008 screen print from webpage http:/www.youtube.com/watch?v=W_Mu5wYVQrY (Z30).

Soil Warrior—Environmental Tillage Systems, Inc., Function of Mini Warrior Zone Tillage video, Sep. 18, 2008, screen print from webpage http:/www.youtube.com/watch?v=vcU-V5fU9wk (Z31).

Dan Zinkand, Strip-Tillers Putting Manure In Its Place, 2014, Lessiter Publications, Brookfield, WI 53045 (Z32).

Bigham Brothers, Inc., Super Duty Cultivator, Screen print from web: http://www.bighambrothers.com/cultivator-super-duty.htm (Z33).

Summers, Supercoulter Plus product brochure (Z34).

Mick Zoske, letter regarding prior art dated Dec. 11, 2013.

Zoske's Sales & Service, Inc., Answer to interrogatory explaining basis for invalidity dated Jul. 28, 2014.

David Breiner, email regarding prior art dated Apr. 23, 2014.

Summers Manufacturing Co., Inc,, Summers Supercoulter Plus, product webpage.

SLURRY APPLICATOR FOR AN AGRICULTURAL MACHINE

This application is a divisional of U.S. patent application Ser. No. 13/113,610 filed May 23, 2011 and claims priority to U.S. Provisional Application No. 61/423,462 filed Dec. 15, 2010, which applications are incorporated in their entirety by reference herein.

BACKGROUND

The present invention relates to agriculture fertilizer applicators. More specifically, the invention relates to an apparatus for subsoil application of livestock waste in the form of slurry (animal waste).

Historically, livestock waste, particularly in solid form, has been spread on the surface of the soil by a manure spreader using a flail to fling the material to the rear. A more modern side-discharge spreader also discharges the material on the surface of the soil. The advent of confinement systems for animals, which include pits below the confinement area, produces a large amount of animal waste, which must be handled and disposed of in a slurry form. Typically, the slurry is pumped into a large tank carried by a wagon, but it is still, for the most part, spread or sprayed on the surface of the soil.

This procedure has, as a principle objection, a strong odor, which resides after the waste is spread. Moreover, surface spreading of animal waste creates a hazard with the potential runoff of nitrates into rivers and streams or seeping of the material into ground water. This is objectionable because livestock waste is high in nitrogen, and with increasing concern with the quality of drinking water, this procedure is becoming less and less acceptable.

Various methods have been proposed for depositing the slurry into the ground. All the known methods, however, require dragging a knife through the soil to open a trough for the slurry. This limits the speed by which the tractor can travel and inefficiently wastes fuel by dragging a knife through the ground.

SUMMARY

A method is provided for depositing slurry into a ground surface for nutrition of crops and plants. A trough is cut in the ground surface by a rotating member. The rotating member acts by displacing soil upward with respect to the ground surface and rearwardly with respect to a direction of travel of the rotating member. While the soil is in the air, slurry is deposited into the trough. The soil is then redirected downward to the trough to cover the slurry with the soil. The rotating member may be a coulter blade that has a plurality of flutes formed on a first and a second side of the blade. The flutes have a leading edge that enters the ground substantially perpendicular with respect to the ground and exits at an angle to eject soil upward and outward.

A power cylinder applies downward vertical force on an axis of rotation for the coulter blade to keep the coulter blade at a substantially consistent depth with respect to the ground surface. The depth of the trough is maintained generally consistent by a spool positioned on the axis of rotation of the coulter blade to resist downward vertical pressure from the power cylinder. A spring is provided to allow for upward movement of the coulter blade in the event coulter blade engages an object in the ground.

The applicator disclosed provides substantially consistent coverage of the slurry that is in the trough while moving in a range of three to fifteen miles per hour with respect to the ground surface. In operation, the applicator can deposit more than six thousand gallons of slurry per acre in the trough with substantially minimal runoff.

BRIEF DESCRIPTION OF THE ILLUSTRATED EMBODIMENT

These and other features and advantages of the present invention will be better understood by reading the following detailed description, taken together with the drawings wherein.

DETAILED DESCRIPTION OF THE ILLUSTRATED EMBODIMENT

The invention provides an apparatus for injecting fertilizer slurry 132 into the ground. While the disclosure is directed toward the use of manure as the fertilizer slurry 132, other forms of fertilizer may be used as desired.

Figure 1:
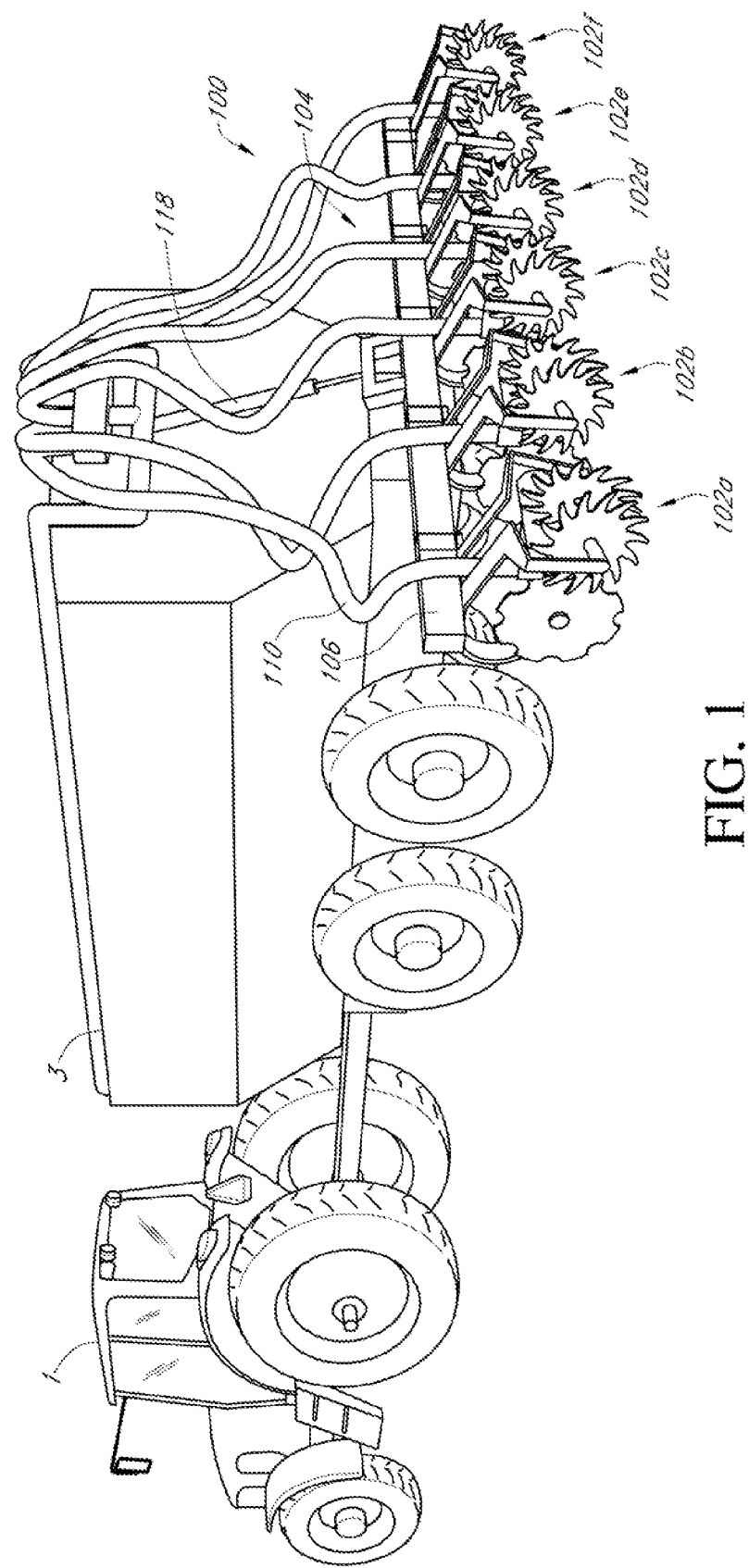
FIG. 1 is a perspective view of a tractor and tanker with a slurry applicator attached at the rear for injecting slurry into the ground.
Figure 5:
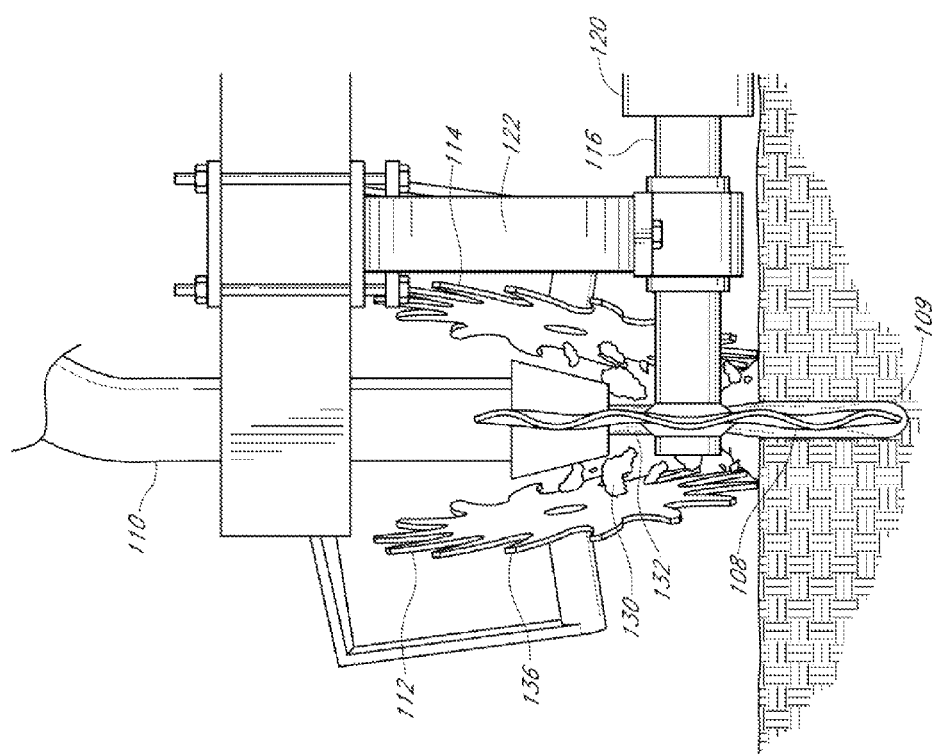
FIG. 5 is a frontward facing view of the slurry applicator of FIG. 4 demonstrating its motion through the field.
Figure 6:
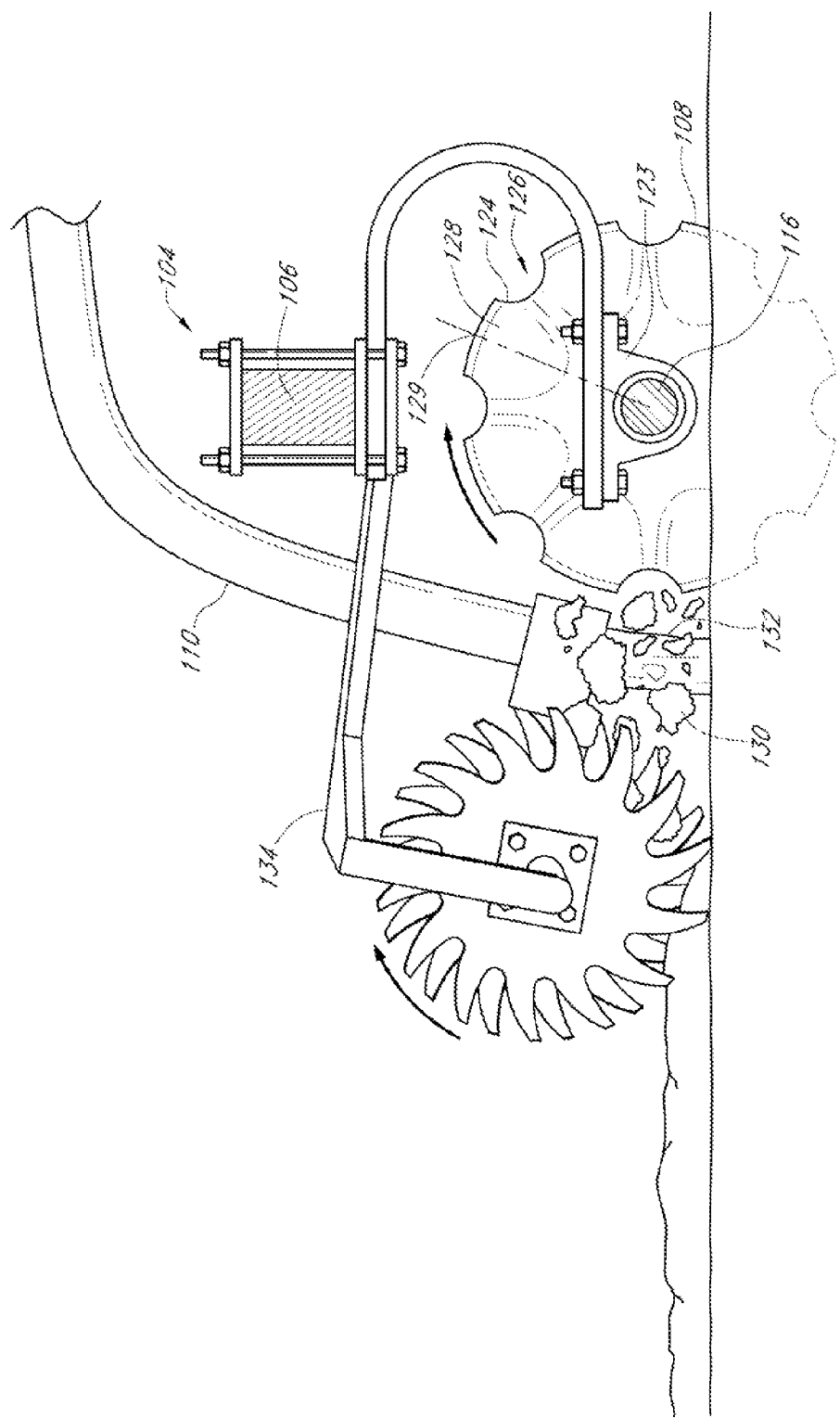
FIG. 6 is a side view of the slurry applicator of FIG. 5 demonstrating its motion through the field.

FIG. 1 shows a tractor 1 pulling a tanker 3 that is full of slurry 132 and an applicator 100 for injecting slurry 132 into the ground. Tanker 3 has conventional pumps for moving the slurry 132 through hoses 110 to the ground. Applicator 100 has six slurry injectors 102a-f spaced approximately thirty inches apart, measured between coulter blades 108, which corresponds roughly to the distance between rows in a field. A person skilled in the art will readily realize that a number of such units can be located in spaced relation, side by side, and at any lateral spacing desired by the farmer or operator. FIGS. 5 and 6 show slurry injector 102 in an operating motion where slurry 132 is shown flowing into trough 109.

Figure 2:
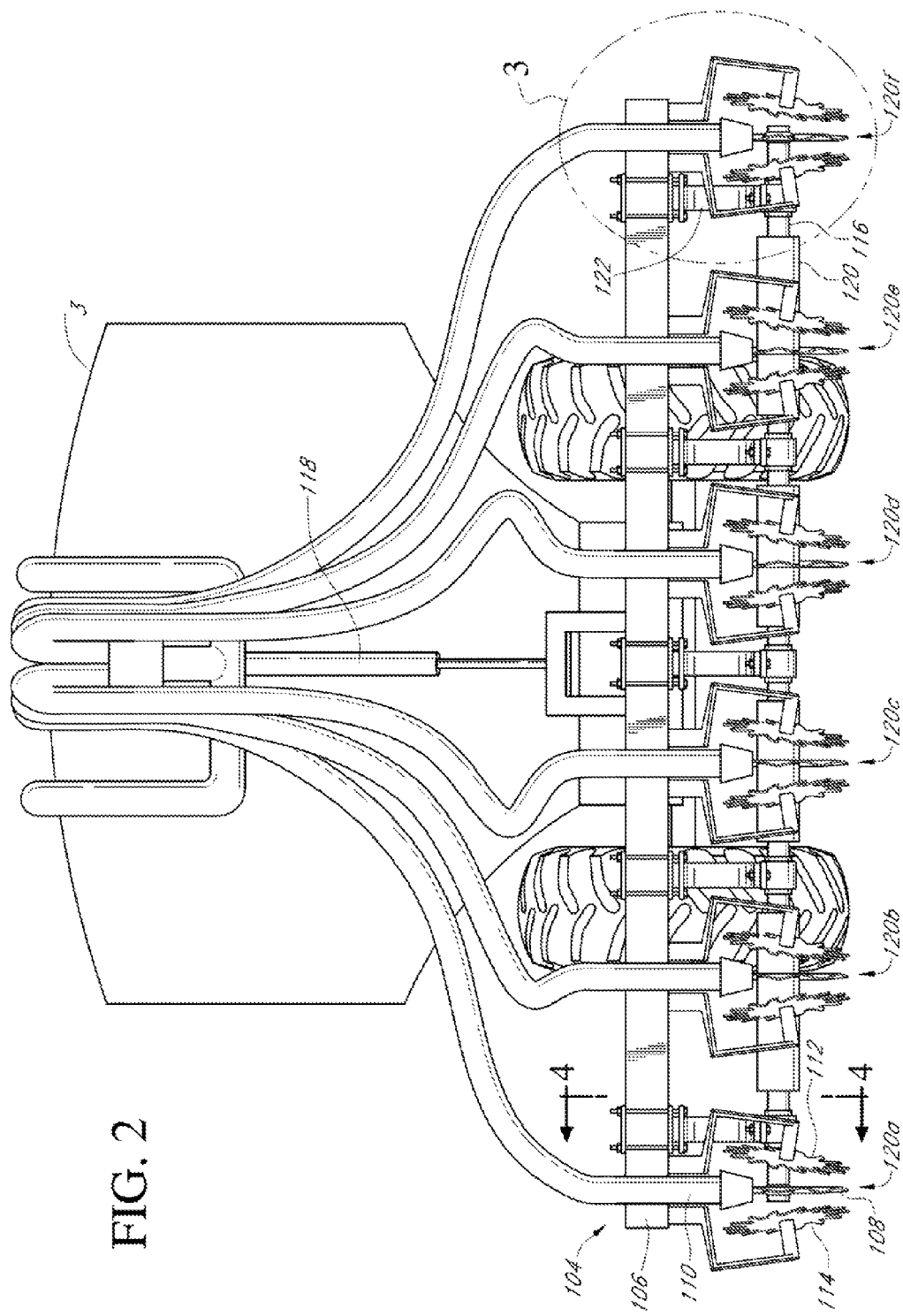
FIG. 2 is a rearward facing view of the apparatus shown in FIG. 1 showing six slurry applicators corresponding to six rows in a field.

FIG. 2 shows applicator 100 viewed from the rear. A frame 104 is attached to spreader 3 by a hitch (not shown) in a conventional manner. Frame 104 has a cross bar 106 that extends lengthwise and perpendicular to the direction of travel of spreader 3. Attached to frame 104 and positioned beneath cross bar 106 are slurry injectors 102a-f for injecting the slurry into ground and covering the slurry thereafter. As best seen in FIGS. 5 and 6, each slurry injector 102 is comprised generally of a coulter blade 108 to open a trough 109 in the ground, a hose 110 positioned behind coulter blade 108 to deposit slurry into trough 109, and a pair of containment wheels 112, 114 to cover trough 109.

Figure 3:
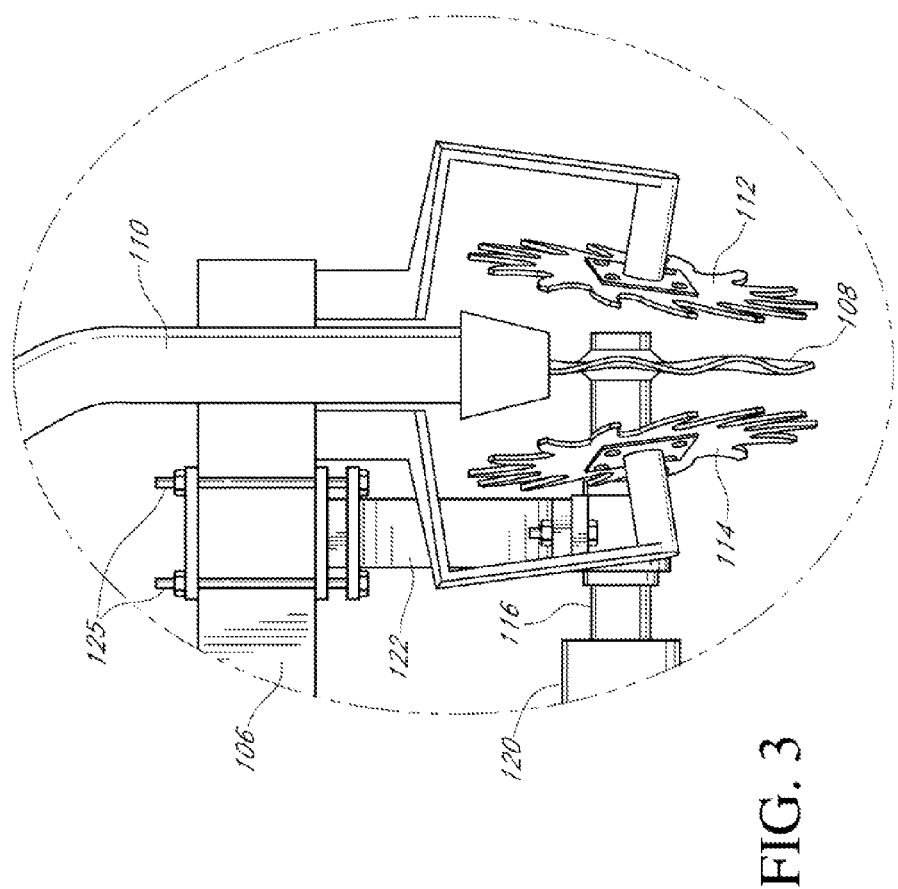
FIG. 3 is a close-up view of the slurry applicator in area 3 of FIG. 2.
Figure 4:
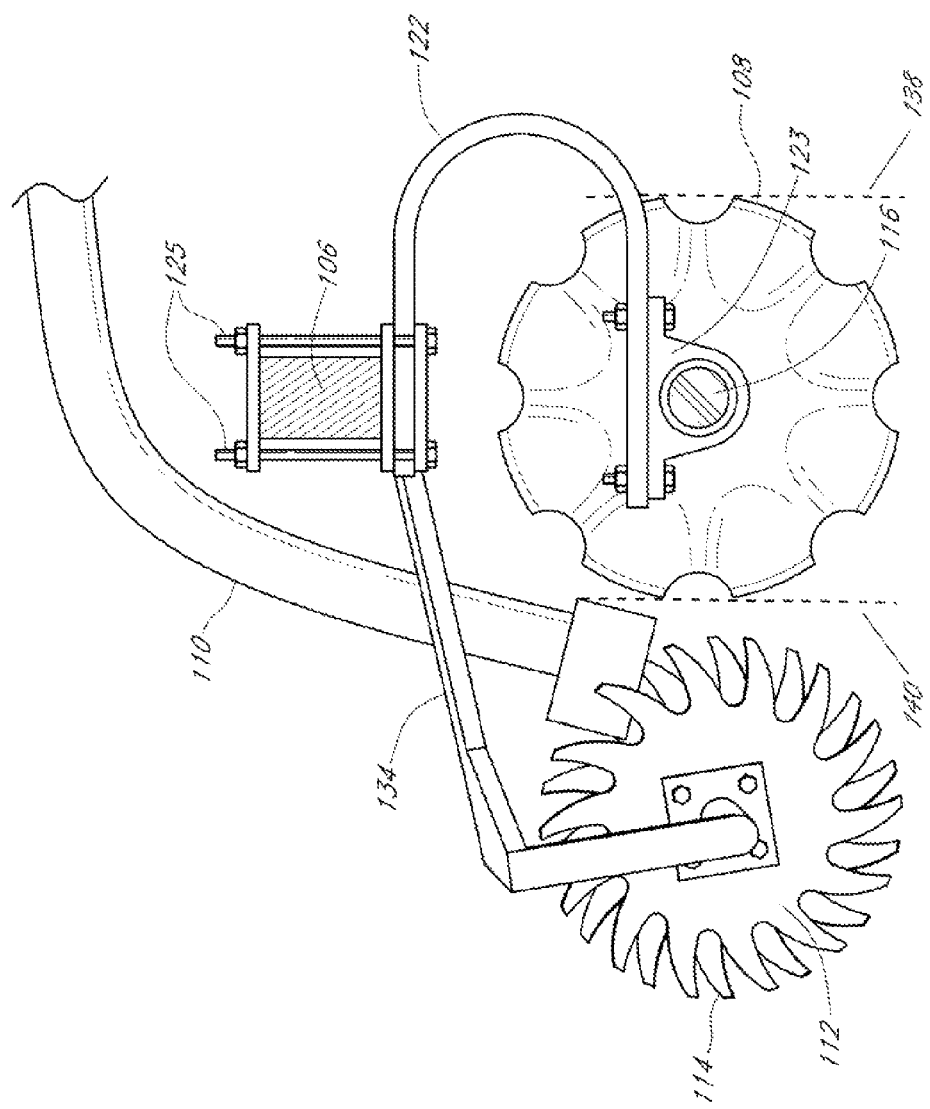
FIG. 4 is a side view of one slurry applicator taken from line 4 of FIG. 2.

FIGS. 3 and 4 show a close up view of a single slurry injector 102. A bearing assembly 123 mounts coulter blade 108 to a hub 116. Coulter blade 108 rotates freely on hub 116, and as applicator 100 moves through a field its rounded profile allows coulter blades 108 to cut by rotary motion through the ground and eject soil upward to create trough 109. This has several advantages over prior art fixed knives that are dragged through the ground to open trough 109. For example, rotating a coulter blade 108 through the ground creates less drag than pulling a knife. This allows applicator 100 to move faster over the ground under less power and making the farming operator more efficient. Furthermore, rotating coulter blade 108 slices into the ground and ejects the soil with virtually no compression of the soil on the sides of trough 109 allowing maximum absorption of slurry 132 into the soil. This is unlike pulling the knife which compresses the sides of trough 109 as its pulled through the ground.

A power cylinder, such as a hydraulic cylinder 118 (shown in FIGS. 1 and 2) applies downward force to frame 104 generally in line with each coulter blade's 108 axis of rotation to keep the coulter blades 108 in the ground at a depth sufficient to create a trough. Power cylinder 118 is easily adjustable allowing the operator to control the amount of downward pressure applied to coulter blades 108. Furthermore, having downward pressure applied in line with the rotational axis of coulter blades 108 reduces the amount of external pressure necessary to push coulter blade 108 into the ground. This is especially important for fertilizing fields with genetically modified crops, because the residue and corn stocks are becoming more difficult to cut. While coulter blades have generally been available for use in surface level farming applications to chop corn stock and other surface debris, coulter blade 108 described herein is forced into the ground by power cylinder 118 to form trough 109 that is sufficiently deep to receive slurry. Until the invention described herein, no agricultural machine has used a coulter blade in such a manner.

A spool 120 is positioned along the axis of hub 116 to function as a depth gauge. Spool 120 has a diameter larger than hub 116 with a large surface area so as to engage the ground to roll across the soil, and therefore resist being pushed into the ground. The depth of penetration for coulter blade 108 is measured by the difference between the radius of coulter blade 108 and spool 120. By increasing or decreasing the diameter of spool 120, the depth of ground penetration can be controlled. Incorporating the depth gauge with spool 120 eliminates the need for an extra wheel and linkage assembly, as shown in the prior art, to control the depth of trough 109.

As best seen in FIG. 4, a C-shaped spring 122 is positioned between cross bar 106 and hub 116. C-shaped spring 122 is formed from spring steel bent into a C-shape. C-shaped spring 122 is attached to hub 116 by bearing assembly 123 and attached to cross bar 106 by a pair of u-shaped bolts 125. C-shaped spring 122 allows coulter blade 108 to move over obstacles, such as rocks encountered during tillage. A person skilled in the art will readily realize that various other types of springs or suspension systems are contemplated within the instant disclosure of the invention.

FIGS. 5 and 6 show a close up view of a slurry injector 102 as it travels through the ground. Each coulter blade 108 is a wave-shaped disc designed to cut into the ground and eject soil to create trough 109. Each coulter blade 108 (as shown in FIG. 4) has a front edge 138 and a rear edge 140 where the distance between represents the diameter of coulter blade 108. Coulter blade 108 is formed from an approximately quarter-inch thick piece of flat steel with eight notches 126 formed around its circumference and eight waves 128 or angled flutes to create a blade with a functional width of 1¾ inches. Wave 128 has its low points near the center of notch 126 and it gradually slopes upward to its high point on radial line 129. The shape of coulter blade 108 is designed such that, in forward rotation through the ground, a leading edge 124 of wave 128 cuts cleanly into the ground with minimal compression of the soil on lateral sides of the cut to allow for maximum absorption of the slurry. As leading edge 124 of wave 128 exits trough 109, the angle of wave 128 as it exits the ground causes large chunks of soil 130 to eject upward out of trough 109 and outward away from hose 110 leaving a void for slurry to flow generally uninterrupted into trough 109. A person skilled in the art will readily realize that coulter blade 108 can take various shapes provided it is functional in the manner described above.

Hose 110 is positioned behind rear edge 140 of coulter blade 108 to deposit slurry 132 into trough 109 as it is formed by coulter blade 108. Conventional hose clamps may be positioned to hold hose 110 in a fixed position during operation. Slurry from tanker 3 is pumped through hose 110 and out into trough 109. Because coulter blade 108 ejects dirt from trough 109 upward and outward, hose 110 can be positioned behind coulter blade 108 so as to deposit slurry into trough 109 without interference from the ejected dirt, which is not thrown into the stream of slurry flowing out of hose 110.

Ejected dirt is redirected back to trough 109 by a pair of containment wheels 112 and 114 positioned rearwardly with respect to each coulter blade 108 and hose 110. Containment wheels 112, 114 are pivotally attached to frame 104 by a pivot bar 134 so that containment wheels 112, 114 ride generally on top of the ground and move upward and downward with changes in ground surface level. Containment wheels 112, 114 are each circumscribed by a plurality of tines 136 extending from the solid center portion of the wheel, which helps the wheel turn as it travels across the soil. The angle of retaining wheels 112, 114 relative to coulter blade 108 can be adjusted so that substantially all the dirt 130 ejected by coulter blade 108 is redirected to trough 109 leaving the appearance of an undisturbed or slightly raised surface. Containment wheels 112, 114 are repositionable with respect to their angle and distance from coulter blade 108 depending on the average operating speed of applicator 100. A faster speed of applicator 100 may require containment wheels 112, 114 to be moved rearward and their angle to be adjusted to properly redirect soil 130 back into trough 109.

In operation, each slurry injector 102 cuts a trough 109 in the ground surface with rotating coulter blade 108. Soil 130 is ejected up, out, and away from coulter blade 108. Slurry 132 is deposited into trough 109 while soil 130 is in an upward position with respect to the ground surface. The ejected soil 130 is redirected downward by containment wheels 112, 114 back to trough 109 to cover slurry 132. The aforementioned process works best when applicator 100 is moving at least 3 miles per hour to eject soil 130 from trough 109. As far as maximum speed, applicator 100 can operate smoothly in its intended manner in the 12-15 mph, which is considered extremely fast for slurry applicators and generally beyond the limits of prior art devices. In fact, the speed of applicator 100 is limited by power cylinder's 118 ability to push coulter blade 108 into the ground and the horsepower of tractor 1 pulling applicator 100. With the use of applicator 100 of the invention slurry 132 is injected essentially into the subsurface of the ground. As a result, crops more efficiently absorb slurry 132 as food and the amount of runoff contamination into surrounding streams is reduced greatly.

While the present invention has been particularly shown and described with reference to exemplary embodiments thereof, it should be understood by those of ordinary skill in the art that various changes, substitutions and alterations could be made herein without departing from the scope of the invention as defined by appended claims and their equivalents. It is intended that various aspects of various embodiments can be combined in new combinations to create new embodiments within the scope of the invention. The invention can be better understood by reference to the following claims. For purpose of claim interpretation, the transitional phrases "including" and "having" are intended to be synonymous with the transitional phrase "comprising."

What is claimed is:

1. A method for depositing slurry into a ground surface, the method comprising:
    cutting a trough in the ground surface soil with a rotating member;
    displacing a majority of the soil from the trough upwardly and airborne with respect to the ground surface;
    depositing the slurry in the trough while the soil is in an upward and airborne position with respect to the ground surface; and
    directing the soil downward into the trough after the slurry has been deposited therein to cover the slurry with the soil.

2. The method of claim 1, wherein the rotating member is a coulter blade with a plurality of angled flutes to open the trough with minimal compression of a side of the trough to allow for maximum absorption of the slurry.

3. The method of claim 2, wherein the angled flutes of the coulter blade exits the trough at an angle with respect to the ground surface to eject the soil from the trough upwardly.

4. The method of claim 3, and further comprising applying a downward vertical force on an axis of rotation for the coulter blade to keep the coulter blade at a substantially consistent depth with respect to the ground surface.

5. The method of claim 4, and further comprising controlling the depth of the trough with a spool positioned on the axis of rotation of the coulter blade to resist downward vertical pressure to keep the depth of the trough substantially consistent.

6. The method of claim 5, and further comprising providing for upward movement of the coulter blade when the coulter blade engages an object in the ground.

7. The method of claim 6, and further comprising providing substantially consistent coverage of the slurry that is in the trough while depositing of the slurry is conducted at a speed in a range of three to fifteen miles per hour with respect to the ground surface.

8. The method of claim 7, depositing more than six thousand gallons of slurry per acre in the trough with substantially minimal runoff.

9. The method of claim 1, and further comprising displacing the majority of the soil behind an axis of rotation of the rotating member.

10. The method of claim 9, and further comprising displacing the soil outward from the trough and away from the slurry being deposited in the trough.

11. The method of claim 1, depositing the slurry in the trough below a surface level of the ground.

12. The method of claim 1, wherein the slurry comprises livestock waste.

13. A method for depositing slurry in a ground, the method comprising:
    cutting a trough in the ground with a rotating member;
    displacing a majority of a soil from the trough upwardly and airborne with respect to the ground;
    depositing a majority of the slurry in the trough while the soil is displaced from the trough; and
    directing a majority of the soil into the trough after the majority of the slurry has been deposited in the trough to substantially cover the majority of the slurry with the soil.

14. The method of claim 13, and further comprising displacing the soil outward from the trough and away from the slurry being deposited in the trough.

15. The method of claim 14, and further comprising depositing the slurry in the trough below a surface level of the ground.

16. The method of claim 15, and further comprising providing substantially consistent coverage of the slurry that is in the trough while the depositing of the slurry is conducted at a speed in a range of twelve to fifteen miles per hour.

17. A method for depositing livestock waste in a ground, the method comprising:
    cutting a trough in the ground with a rotating member
    displacing a majority of a soil from the trough upwardly and airborne with respect to the ground and outward with respect to the trough;
    depositing a majority of the livestock waste in the trough while the majority of the soil is displaced from the trough; and
    directing a majority of the soil into the trough after the livestock waste has been deposited in the trough to substantially cover the livestock waste with the majority of the soil.

18. The method of claim 17, wherein the rotating member is a coulter blade with angled flutes that exit the trough at an angle with respect to the ground to eject the soil from the trough upwardly, and further comprising applying a downward vertical force on an axis of rotation for the coulter blade to keep the coulter blade at a substantially consistent depth with respect to the ground, and further comprising controlling the depth of the trough with a spool positioned on the axis of rotation of the coulter blade to resist downward vertical pressure to keep the depth of the trough substantially consistent, and further comprising providing for upward movement of the coulter blade when the coulter blade engages an object in the ground.

19. The method of claim 17, and further comprising providing for upward and downward movement of a containment wheel positioned on each side of the trough, wherein the containment wheel on each side of the trough cooperate to direct the majority of the soil into the trough while simultaneously traveling generally on top of the ground without a positive force pushing the containment wheel in the ground, and further comprising leaving an appearance of a slightly raised surface after covering the livestock waste with the majority of the soil.

\* \* \* \* \*